(12) United States Patent
Pullela (10) Patent No.: US 7,336,660 B2
(45) Date of Patent: Feb. 26, 2008

(54) METHOD AND APPARATUS FOR PROCESSING PACKETS BASED ON INFORMATION EXTRACTED FROM THE PACKETS AND CONTEXT INDICATIONS SUCH AS BUT NOT LIMITED TO INPUT INTERFACE CHARACTERISTICS

(75) Inventor: Venkateshwar Rao Pullela, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 10/159,055

(22) Filed: May 31, 2002

(65) Prior Publication Data

US 2003/0231631 A1 Dec. 18, 2003

(51) Int. Cl.
*H04L 12/28* (2006.01)
*H04L 12/56* (2006.01)
*H04L 12/66* (2006.01)

(52) U.S. Cl. ........................................ 370/392; 370/352
(58) Field of Classification Search ...................... None
See application file for complete search history.

(56) References Cited

U.S. PATENT DOCUMENTS

| | | |
|---|---|---|
| 5,088,032 A | 2/1992 | Bosack |
| 5,319,763 A | 6/1994 | Ho et al. |
| 5,481,540 A | 1/1996 | Huang |
| 5,515,370 A | 5/1996 | Rau |
| 5,740,171 A | 4/1998 | Mazzola et al. |
| 5,842,040 A | 11/1998 | Hughes et al. |
| 5,898,689 A | 4/1999 | Kumar et al. |
| 5,920,886 A | 7/1999 | Feldmeier |
| 5,930,359 A | 7/1999 | Kempke et al. |

(Continued)

FOREIGN PATENT DOCUMENTS

| | | |
|---|---|---|
| EP | 1085723 A2 | 3/2001 |
| EP | 1180882 A2 | 2/2002 |
| EP | 1085723 A3 | 5/2003 |
| WO | WO 01/84774 A2 | 11/2001 |
| WO | WO 01/84774 A3 | 11/2001 |
| WO | WO 02/30062 A1 | 4/2002 |

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Daniel J. Ryman
(74) *Attorney, Agent, or Firm*—The Law Office of Kirk D. Williams (57) ABSTRACT

A context vector, typically used in a lookup operation of an associative memory, is generated based on a context of a received packet and the packet itself. In one implementation, multiple interfaces can share a common access control list as the context vector provides an indication of the result of unique processing required because of varying contexts, such as, but not limited to different interfaces, source addresses, and virtual network addresses. One implementation includes an input interface circuitry, a context indicator generator, a lookup word field generator, and an associative memory. The context indicator generator generates a context vector corresponding to a characteristic of the input interface circuitry. The lookup word field generator generates one or more lookup word vectors based on the packet. The associative memory performs a lookup operation based on the context vector and lookup word vectors.

26 Claims, 8 Drawing Sheets

U.S. PATENT DOCUMENTS

| | | | |
|---|---|---|---|
| 6,000,008 | A | 12/1999 | Simcoe |
| 6,061,368 | A | 5/2000 | Hitzelberger |
| 6,091,725 | A | 7/2000 | Cheriton et al. |
| 6,097,724 | A | 8/2000 | Kartalopoulos |
| 6,141,738 | A | 10/2000 | Munter et al. |
| 6,147,976 | A * | 11/2000 | Shand et al. ............. 370/254 |
| 6,148,364 | A | 11/2000 | Srinivasan et al. |
| 6,219,748 | B1 | 4/2001 | Srinivasan et al. |
| 6,236,658 | B1 | 5/2001 | Essbaum et al. |
| 6,237,061 | B1 | 5/2001 | Srinivasan et al. |
| 6,240,485 | B1 | 5/2001 | Srinivasan et al. |
| 6,243,667 | B1 | 6/2001 | Kerr et al. |
| 6,285,378 | B1 | 9/2001 | Duluk, Jr. |
| 6,289,414 | B1 | 9/2001 | Feldmeier et al. |
| 6,295,576 | B1 | 9/2001 | Ogura et al. |
| 6,308,219 | B1 | 10/2001 | Hughes |
| 6,374,326 | B1 | 4/2002 | Kansal et al. |
| 6,377,577 | B1 | 4/2002 | Bechtolsheim et al. |
| 6,381,242 | B1 | 4/2002 | Maher, III et al. |
| 6,389,506 | B1 | 5/2002 | Ross et al. |
| 6,430,190 | B1 | 8/2002 | Essbaum et al. |
| 6,434,662 | B1 | 8/2002 | Greene et al. |
| 6,526,474 | B1 | 2/2003 | Ross |
| 6,535,951 | B1 | 3/2003 | Ross |
| 6,658,002 | B1 | 12/2003 | Ross et al. |
| 2002/0009076 | A1 | 1/2002 | Engbersen et al. |
| 2002/0126672 | A1* | 9/2002 | Chow et al. ............. 370/392 |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "Patricia—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM Sigmetrics Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

METHOD AND APPARATUS FOR PROCESSING PACKETS BASED ON INFORMATION EXTRACTED FROM THE PACKETS AND CONTEXT INDICATIONS SUCH AS BUT NOT LIMITED TO INPUT INTERFACE CHARACTERISTICS

FIELD OF THE INVENTION

This invention especially relates to computer and communications systems, especially routers and switches; and more particularly, the invention relates to processing packets based on information extracted from the packets and context indications such as, but not limited to an input interface characteristics, and which may include performing an associative memory lookup operation based on a vector indicating the context and information extracted from a received packet.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs require matching packets on a subset of fields of the packet flow label, with the semantics of a sequential search through the ACL rules. IP forwarding requires a longest prefix match.

Known approaches of packet classification include using custom application-specific integrated circuits (ASICs), custom circuitry, software or firmware controlled processors, binary and ternary content-addressable memories (CAMs). The use of programmable software or firmware have advantages as they provide some level of flexibility, which becomes especially important as new protocols and services are added to existing network. Customer typically desire to use their existing hardware (e.g., routers, switches, etc.) to support these new protocols and services. However, known software and firmware implementations are relatively slow, and typically place a performance bound which may be incompatible with new requirements. Various applications that use packet classification, such as Security Access Control, Quality of Service, etc., typically need to perform many matches on source and destination port numbers, protocol and/or other header fields, etc. in order to identify a corresponding netflow.

In a known prior system, one or more fields are extracted from a received packet. These one or more extracted fields typically include source and destination addresses, port numbers, and possibly other fields, typically included in the header or flow label of a packet. These extracted fields are provided in their native format, possibly along with other data, to a CAM, which performs a lookup operation in performing the packet classification. Because CAMs are expensive, especially in terms of space and power consumption and are limited in the width of an input lookup word, one known system preprocesses, via one or more logical functions or operations, certain information contained in a packet to generate a vector that is used as part of a lookup word. This vector reduces the number of bits that would be required if the entire native information was included in the lookup word. Bechtolsheim et al. U.S. Pat. 6,377,577, *inter alia*, discloses a system that includes preprocessing circuitry for generating packet labels for use in lookup operations. When controlling access for packets responsive to their input interfaces, the packet label includes an identifier for the input interface. When controlling access for packets responsive to their output interfaces, the packet label includes an identifier for the output interface. Ross et al., U.S. Pat. No. 6,658,002, *inter alia*, discloses a system that associates an interface number corresponding to the input interface on which an inbound packet was received or the output interface for an outbound packet, with this interface number being mapped into an ACL label. The ACL label can then be used in identifying how to process the inbound or outbound packet, such as the ACL label being included as part of the flow label in a lookup word, and the ACL being used to select additional information to add to the lookup word.

Programming an ACL can be a complex and/or redundant task. Typically, each network or possibly even host system requires a separate series of ACL entries. One known system reduces the overall numbers of ACLs by assigning virtual local area network (VLAN) identifiers to entities (e.g., networks, hosts, and router interfaces). A common ACL can then be shared by multiple entities by mapping their VLAN identifiers to a shared VLAN label, with this shared VLAN label being used to identify the common ACL or entries thereof.

However, in many situations, ACLs used on different interfaces are not the same as, for example, they might have different security requirements. Also, different interfaces may belong to different subnets and use different IP addresses; and thus, for example, separate ACLs entries must be used to verify that the source address of a packet sent from an interface matches the address of the interface. This creates a difficulty especially in the case of a dial-in public network, where the connecting computer and user varies, and the only mechanism currently available to ensure that a packet sent from the connected computer is authorized (e.g., its source address corresponds to the one assigned to it by the dial-in system), is to use a separate ACL for each interface, which can be quite tenuous and expensive as each ACL must be programmed separately. Needed are new methods and apparatus for, inter alia, allowing sharing of an ACL for additional operations and/or functionality.

SUMMARY OF THE INVENTION

Methods and apparatus are disclosed processing packets based on information extracted from the packets and context indications such as, but not limited to an input interface characteristics, and which may include performing an associative memory lookup operation based on a vector indicating the context and information extracted from a received packet. In one embodiment, multiple interfaces share a common access control list as the context vector provides an indication of the result of unique processing required because of varying contexts, such as, but not limited to different interfaces, source addresses, and virtual network addresses. One embodiment includes an input interface circuitry, a context indicator generator, a lookup word field generator, and an associative memory. The input interface circuitry receives a packet. The context indicator generator generates a context vector corresponding to a characteristic of the input interface circuitry. The lookup word field generator generates one or more lookup word vectors based on the packet. The associative memory performs a lookup operation based on a lookup word, the lookup word including said one or more lookup word vectors and the context vector. In one embodiment, a packet is processed directly based on the associative memory result. In one embodiment, a packet is processed based on the result of a memory lookup operation based on the associative memory result. In one embodiment, the result of the memory lookup operation and a value based on the context are used to form an address used in a second memory lookup operation, with this result being used in processing a packet.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Systems and methods are disclosed for processing packets based on information extracted from the packets and context indications such as, but not limited to an input interface characteristics, and which may include performing an associative memory lookup operation based on a vector indicating the context and information extracted from a received packet. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The term "associative memory" refers to all types of known or developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify an alternative selection of one or more, including all, of the conjunctive items.

Systems and methods are disclosed for processing packets based on information extracted from the packets and context indications such as, but not limited to an input interface characteristics, and which may include performing an associative memory lookup operation based on a vector indicating the context and information extracted from a received packet. In one embodiment, a context vector is generated based on a context of a received packet and the packet itself typically for use in, but not limited to a lookup operation in an associative memory. In one embodiment, multiple interfaces share a common access control list as the context vector provides an indication of the result of unique processing required because of varying contexts, such as, but not limited to different interfaces, source addresses, and virtual network addresses.

One embodiment includes an input interface circuitry, a context indicator generator, a lookup word field generator, and an associative memory. The input interface circuitry receives a packet. The context indicator generator generates a context vector corresponding to a characteristic of the input interface circuitry. The lookup word field generator generates one or more lookup word vectors based on the packet. The associative memory performs a lookup operation based on a lookup word, the lookup word including said one or more lookup word vectors and the context vector.

In one embodiment, the characteristic of the input interface circuitry is an assigned address. In one embodiment, the assigned address is an assigned source address, the packet includes a packet source address, and the context indicator generator generates the context vector based on the assigned source address and the packet source address. In one embodiment, the context indicator identifies whether or not the packet source address corresponds to the assigned source address. In one embodiment, the assigned address is an assigned virtual network address, the packet includes a packet source address, and the context indicator generator generates the context vector based on the assigned virtual network address and the packet source address. In one embodiment, the context indicator identifies whether or not the packet source address corresponds to the assigned virtual network address. In one embodiment, the virtual network address comprises a plurality of Internet Protocol (IP) subnets. In one embodiment, the input interface circuitry terminates an analog or digital telephonic call, and the context vector is used to indicate whether a packet sent over this call is authorized to send using a particular source address, source port, and/or particular protocol; and/or to a particular destination address and/or destination port. In one embodiment, the input interface terminates a sequential plurality of analog or digital telephonic calls, and the assigned address varies between each of the sequential plurality of analog or digital telephonic calls. In one embodiment, the context indicator generator includes one or more of a processing element group comprising: shift registers, macros, custom circuitry, processors, memory, computer-readable medium, and an application-specific integrated circuit (ASIC).

In one embodiment, a first partial address is generated from an associative memory lookup operation based on the context and lookup word vectors, and a second partial address is generated based on a context of an input interface. A memory lookup operation is performed based on the first and second partial addresses, wherein typically one of these partial addresses is used as base address and the other is used as an offset value. The result of this memory lookup operation is then used in processing the corresponding packet.

In one embodiment, a context indication and a source address of a packet are received. A context vector is generated based on the context indication and the source address, the context vector indicating whether the source address matched the context indication. One or more lookup values are extracted from the packet. A lookup word including the context vector and said one or more lookup values in generated, and the lookup word is used as input to an associative memory in performing a lookup operation.

In one embodiment, the context indication is an assigned address. In one embodiment, the address is an Internet Protocol (IP) host address. In one embodiment, the address is an Internet Protocol (IP) subnetwork address. In one embodiment, the assigned address is a virtual network address. In one embodiment, the virtual network address includes a plurality of Internet Protocol (IP) subnets. In one embodiment, a second context indication and a second source address of a second packet are received, a second context vector is generated based on the second context indication and the second source address, and wherein the second context indication is different than the context indication, the second source address is different than the source address, and the context vector is the same as the second context vector.

Figure 1A:
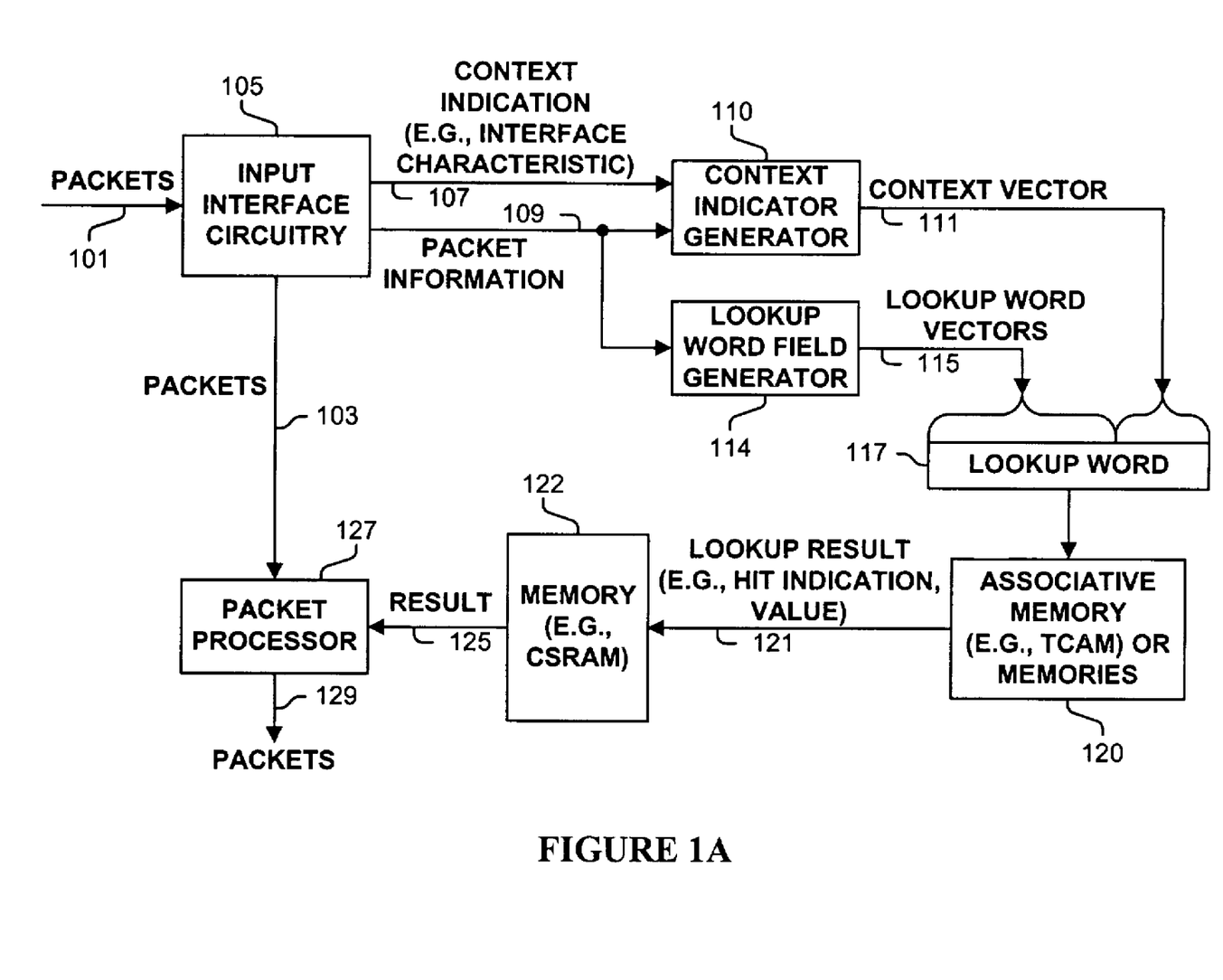
FIG. 1A is a block diagram of one embodiment for generating a context vector based on a context of a received packet and the packet itself for use typically in a lookup operation in an associative memory.

FIG. 1A is a block diagram of an apparatus including one embodiment for generating a context vector based on a context of a received packet and the packet itself for use typically in a lookup operation in an associative memory. Packets 101 are received by input interface circuitry 105 via any communications mechanism and from any source. In one embodiment, input interface circuitry includes elements to terminate a digital or analog dial-up telephone. Input interface circuitry generates a context indication (e.g., an interface characteristic such as an interface identification, an assigned packet or virtual LAN source address, etc.), which is received by context indication generator 110. Additionally, input interface circuitry 105 forwards packet information 109 (e.g., packet header, entire packet, selected fields or portions thereof, etc.) to context indicator generator 110 and lookup word field generator 114. Note, packet information 109 provided to context indicator generator 110 and lookup word field generator 114 may be different.

Context indicator generator 110, based on context indication 107 and packet information 109, generates a context vector 111, which typically indicates some processed or computed result in regards to security, class of service, or any other possible characterization. In one embodiment, context vector 111 indicates whether or not the identified source of a packet is allowed to be sent from input interface circuitry 105. Lookup word field generator 114 extracts fields or portions thereof to produce lookup word vectors 115, which are combined with context vector 111 to produce a lookup word 117. Associative memory 120 performs a lookup operation based on lookup word 117 to produce lookup result 121, which is typically provided to a memory 122 to produce result 125. Based on result 125, packet processor 127 determines whether and how to forward received packets 103, with the forwarded packets denoted by packets 129.

Figure 1B:
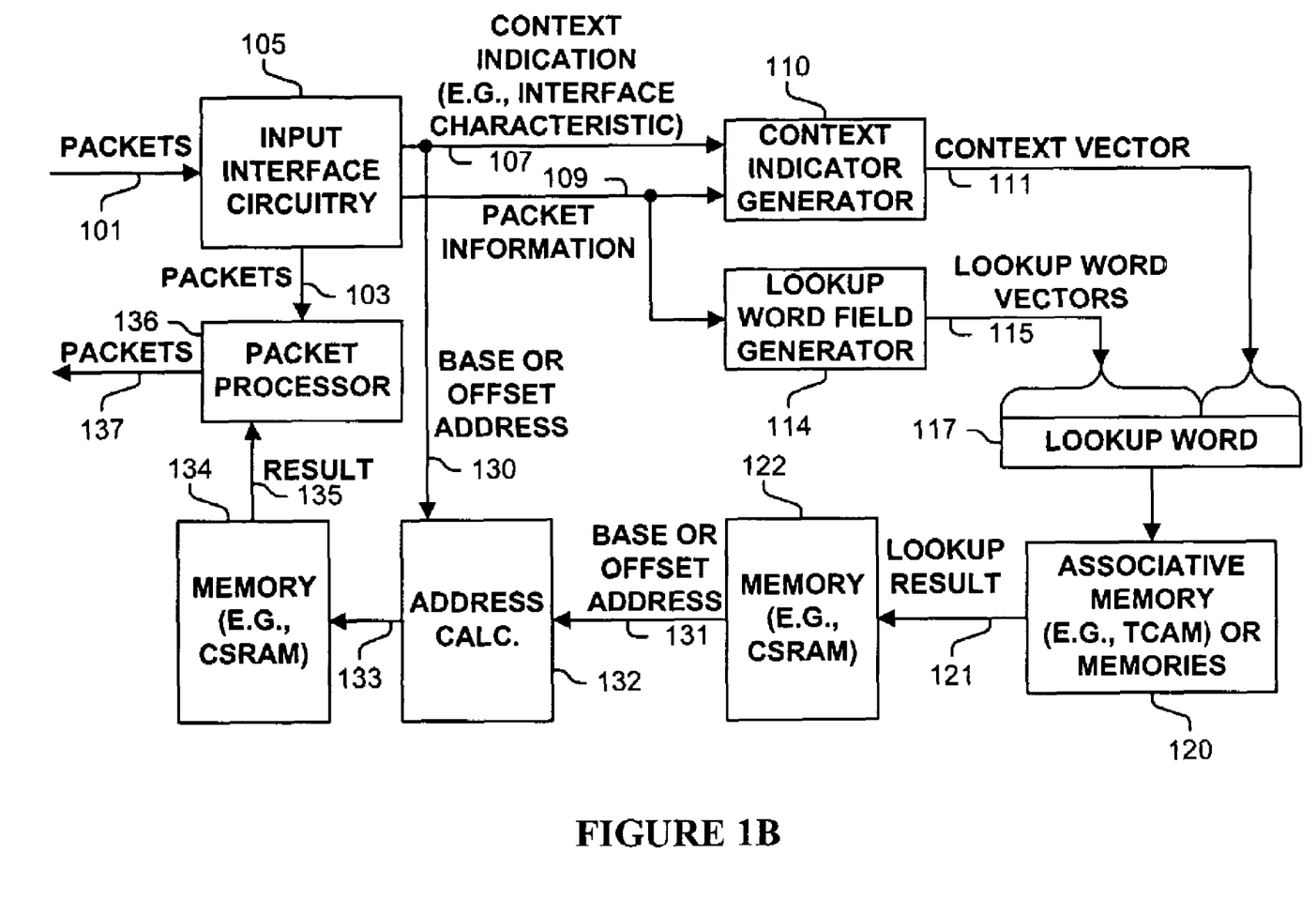
FIG. 1B is a block diagram of one embodiment for generating a context vector based on a context of a received packet and the packet itself for use typically in a lookup operation in an associative memory and as a base or offset address for a memory lookup operation.

FIG. 1B is a block diagram of an apparatus similar to that illustrated in FIG. 1A, wherein memory 122 generates a first partial address 131 (e.g., a base address or offset value) and a second partial address 130 (e.g., a base address or offset value) is derived from context indication 107 or other indication typically generated by input interface circuitry 105. Address calculation mechanism 132, such as an adder or even just physical wires, combines first partial address 131 and second partial address 130 into address 133, which is used by memory (or other computer-readable medium) 134 to generate processing result 135, which is used by packet processor 136 in modifying or forwarding packets 137. In one embodiment, second partial address 130 corresponds to a virtual LAN identifier which is used as a base or offset address in conjunction with the result of processing a corresponding VLAN identifier to generate first partial address 131.

Figure 2:
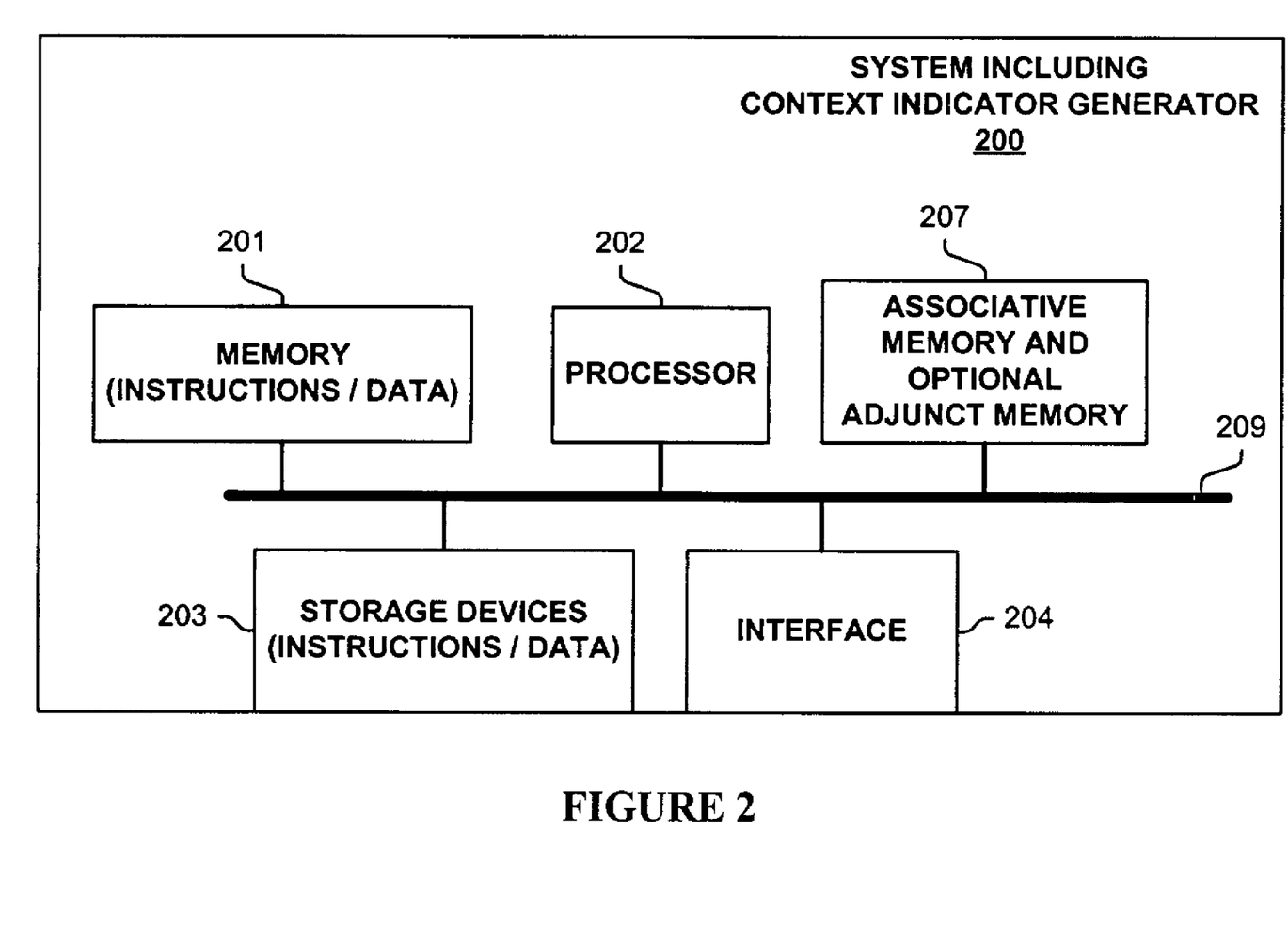
FIG. 2 is a block diagram of one embodiment for generating a context vector based on a context of a received packet and the packet itself for use typically in a lookup operation in an associative memory.

FIG. 2 illustrates a system used in one embodiment for generating a context vector based on a context of a received packet and the packet itself for use typically in a lookup operation in associative memory 207. In one embodiment, system (including a context indicator generator) 200 includes a processor 202, memory 201, storage devices 203, and interface 204 for receiving and transmitting packets or other processed information, and associative memory and optional adjunct memory 207, which are coupled via one or more communications mechanisms 209 (shown as a bus for illustrative purposes).

Various embodiments of system 200 may include more or less elements. The operation of system 200 is typically controlled by processor 202 using memory 201 and storage devices 203 to perform one or more tasks or processes, such as programming associative memory and optional adjunct memory 207 based on an access control list (ACL), generating a context indication and using the context information and extracted information from a received packet to generate a lookup word provided to associative memory and optional adjunct memory 207 which produces a lookup result, and processing a received packet or other information based on the lookup result.

Memory 201 is one type of computer-readable medium, and typically comprises random access memory (RAM), read only memory (ROM), flash memory, integrated circuits, and/or other memory components. Memory 201 typically stores computer-executable instructions to be executed by processor 202 and/or data which is manipulated by processor 202 for implementing functionality in accordance with one embodiment of the invention. Storage devices 203 are another type of computer-readable medium, and typically comprise solid state storage media, disk drives, diskettes, networked services, tape drives, and other storage devices. Storage devices 203 typically store computer-executable instructions to be executed by processor 202 and/or data which is manipulated by processor 202 for implementing functionality in accordance with one embodiment of the invention.

Figure 3:
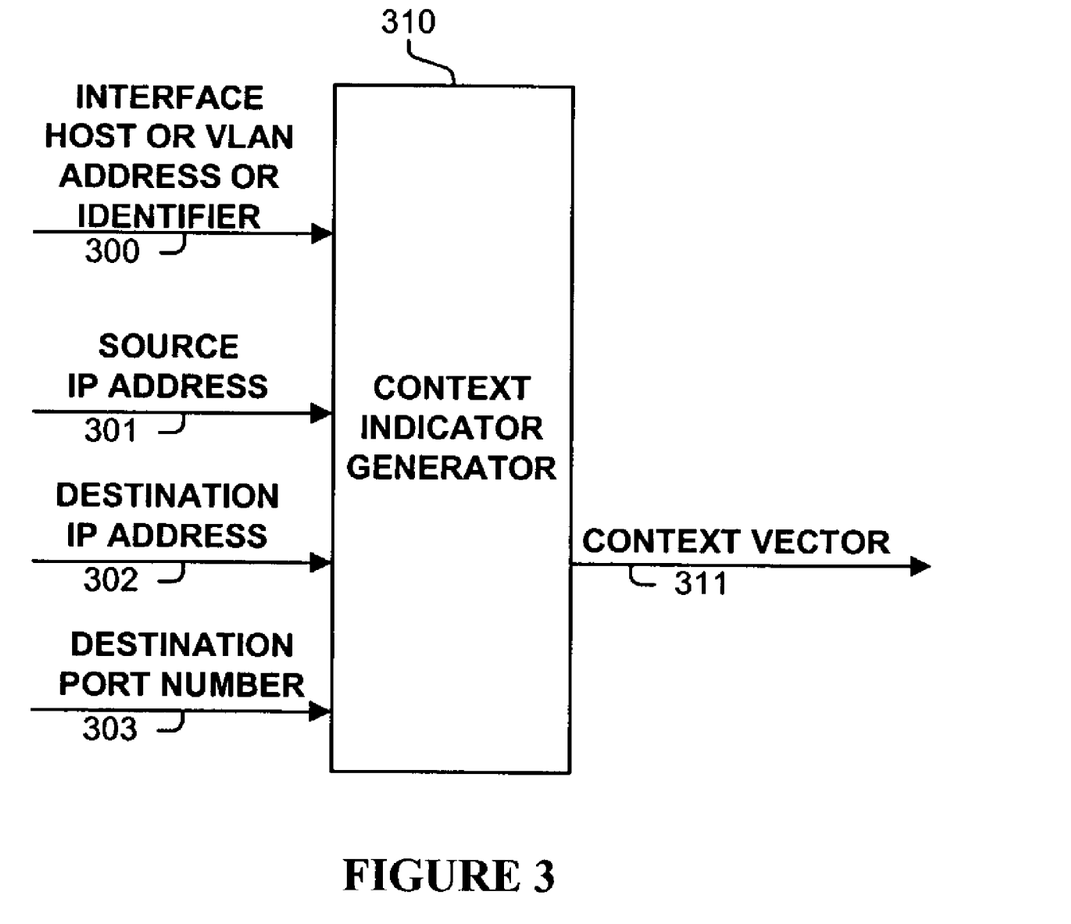
FIG. 3 is a block diagram of a context indicator generator and its input and output signals as used in one embodiment.

FIG. 3 illustrates a block diagram of one embodiment of a context indicator generator 310. In one embodiment, context indicator generator 310 receives a context indication 300 including an interface, host, and/or VLAN address and/or identifier; a source Internet Protocol (IP) address 301, a destination IP address 302, and a destination port number 303. In one embodiment, context indicator generator produces a context vector 311 (e.g., one or more bits) indicating whether, for the context indication 300, (a) the source address is authorized, (b) the destination address is authorized, and/or (c) the destination port is authorized.

Figure 4:
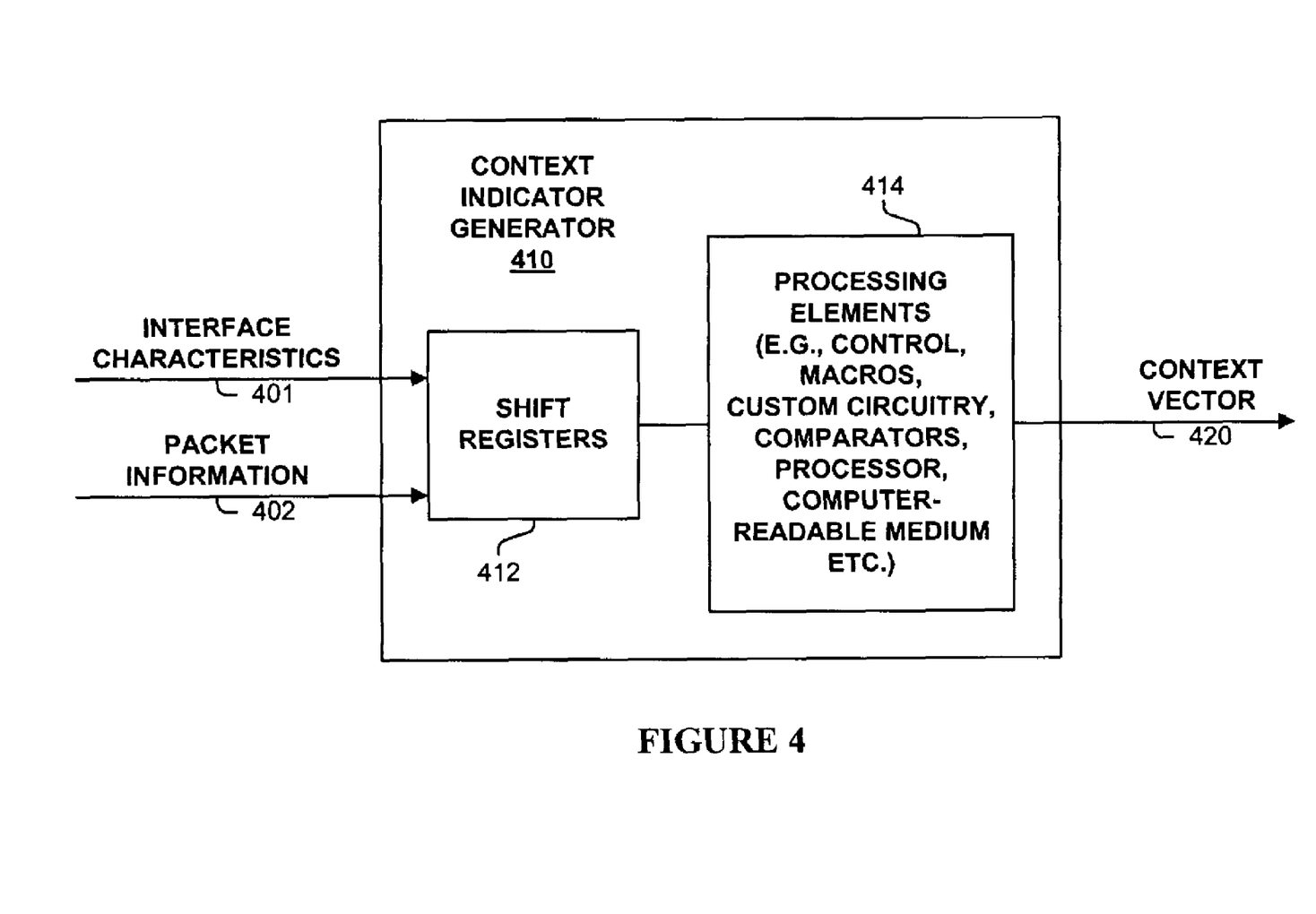
FIG. 4 is a block diagram of a context indicator generator and its input and output signals as used in one embodiment.

FIG. 4 illustrates a context indicator generator 410 used in one embodiment. Context indicator generator 410 receives one or more interface characteristics 401 and packet information 402 (e.g., source, destination, and/or service information) which are stored in shift registers 412. Processing elements 414 (e.g., control, macros, custom circuitry, comparators, processor, computer-readable medium, etc.) are used to manipulate the received information to generate context vector 420. In one embodiment, interface characteristics 401 includes a VLAN identifier indicating a range of authorized source or destination addresses. Using common data manipulation techniques (e.g., masking, shifting, calculations, comparisons, etc.), context vector 420 is generated to indicate whether or not packet information 402 is authorized in the context indicated by interface characteristics 401.

Figure 5A:
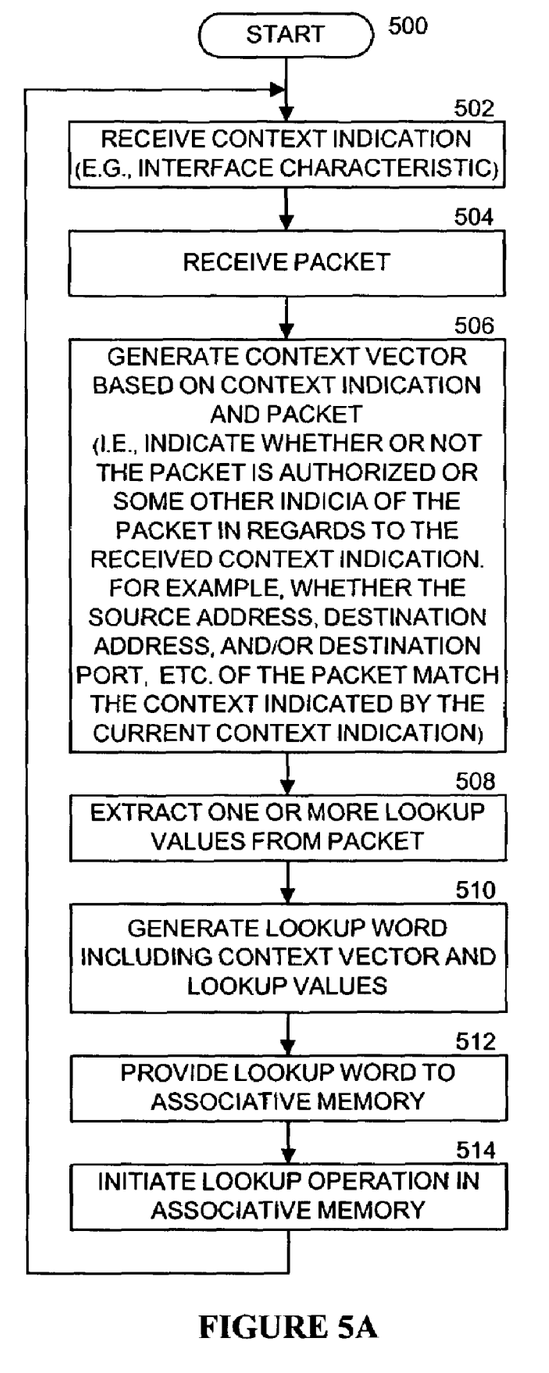
FIG. 5A illustrates a process used in one embodiment for generating a context vector based on a context of a received packet and the packet itself for use typically in a lookup operation in an associative memory.

FIG. 5A illustrate a process used in one embodiment for generating a context vector based on a context of a received packet and the packet itself for use typically in a lookup operation in an associative memory. Processing begins with process block 500, and proceeds to process block 502, wherein a context indication, such as a characteristic of an input interface, is received. Next, in process block 504, a packet is received. In process block 506, a context vector is generated based on the context indication and packet. In one embodiment, the context vector is a single bit indicating an authorized or non-authorized packet. In process block 508, one or more lookup values (e.g., bits, bytes, fields, etc.) are extracted from the packet. In process block 5 10, a lookup word is generated including the context vector and the one or more lookup values. In process block 512, the lookup word is provided to an associative memory, and a lookup operation is initiated in process block 514. Processing then returns to process block 502. Note, in one embodiment, processing returns to process block 504, as the context indication remains the same for a plurality of received packets.

Figure 5B:
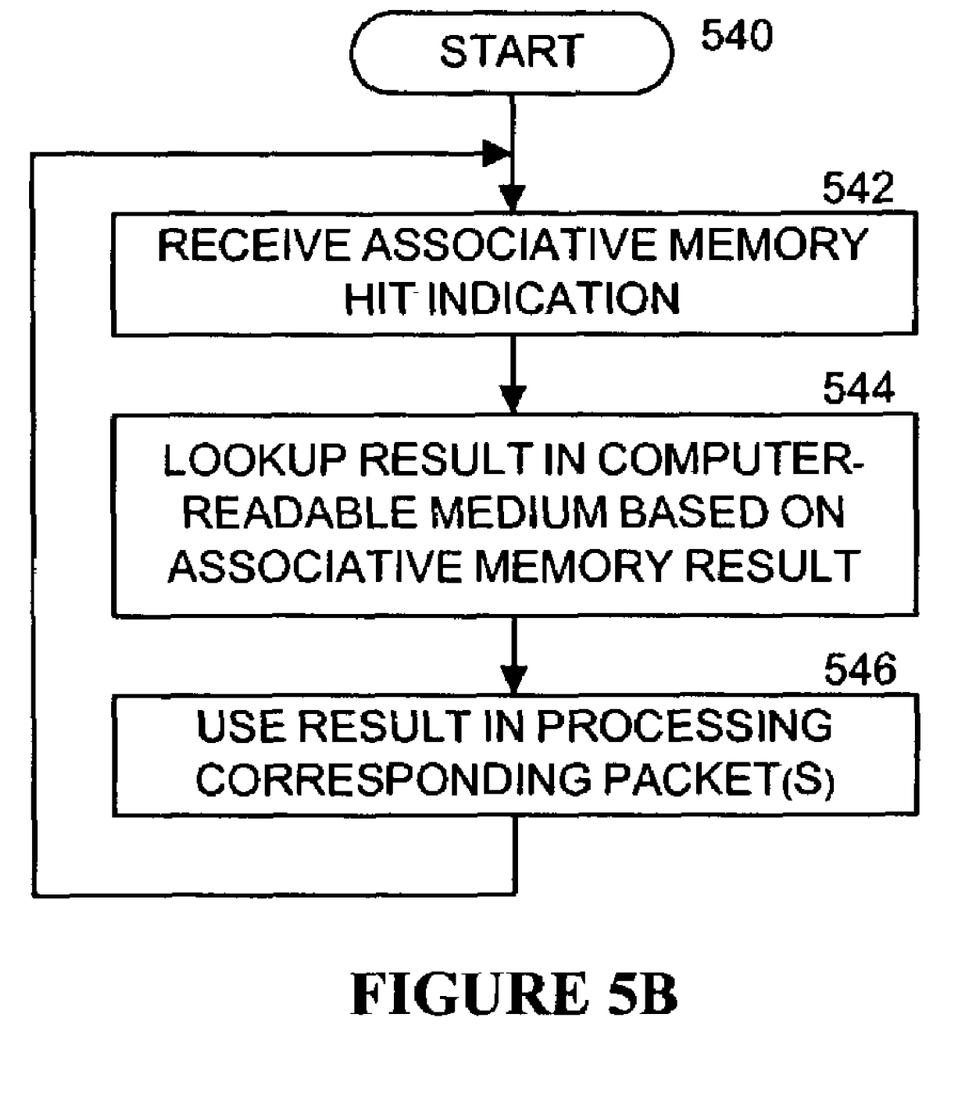
FIG. 5B illustrates a process used in one embodiment for processing a packet based on an associative memory result based on a context of the packet.

FIG. 5B illustrates a process used in one embodiment for processing a packet based on an associative memory result based on a context of the packet. Processing begins with process block 540, and proceeds to process block 542, wherein an associative memory hit indication is received. Next, in process block 544, a lookup result is generated from a memory or other computer-readable medium based on the associative memory result. Next, in process block 546, this lookup result is used in processing the packet. Processing returns to process block 542.

Figure 5C:
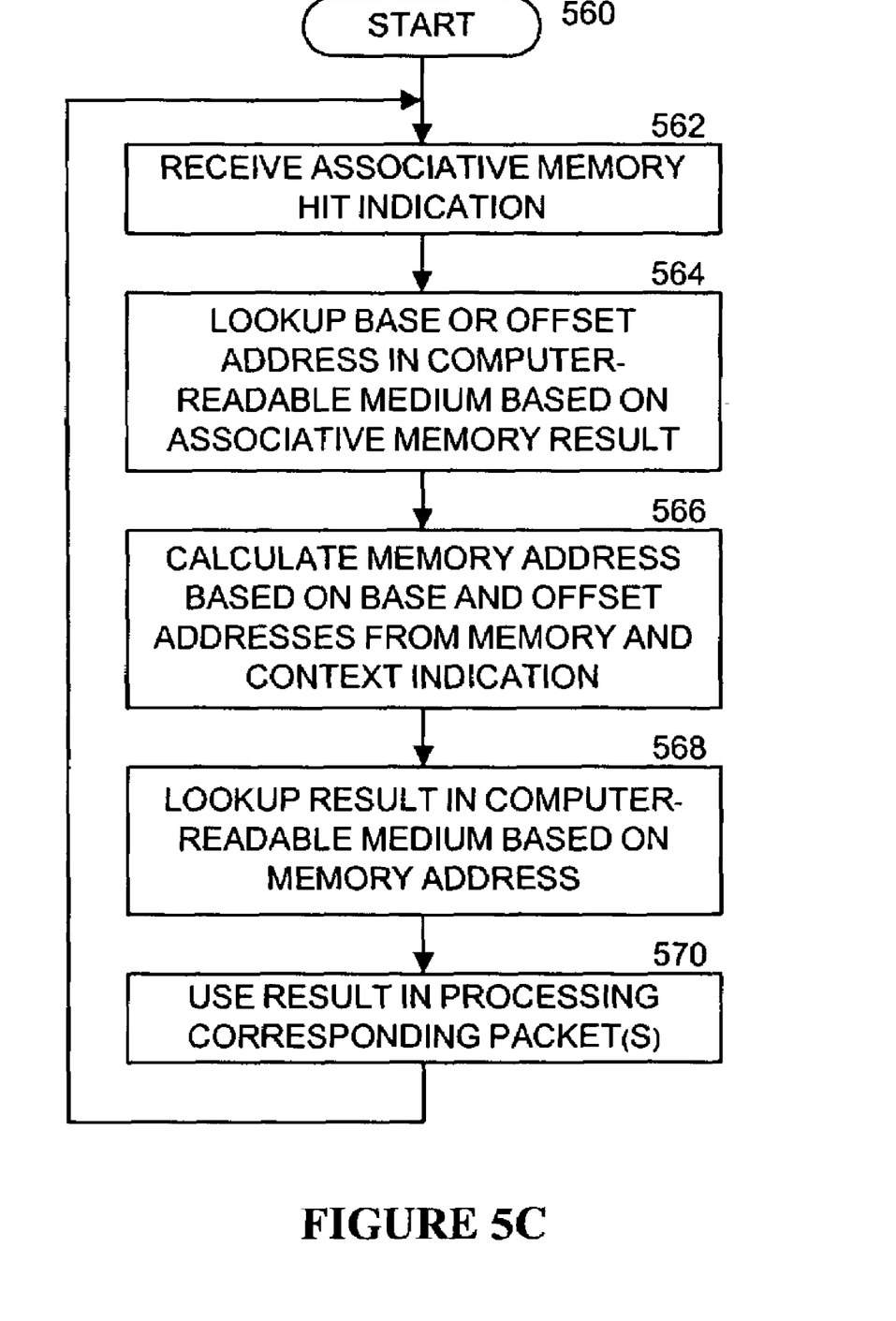
FIG. 5C illustrates a process used in one embodiment for processing a packet based on a result of indexing into a computer-readable medium based on a context of the packet.

FIG. 5C illustrates a process used in one embodiment for processing a packet based on a result of indexing into a computer-readable medium based on a context of the packet. Processing begins with process block 560, and proceeds to process block 562, wherein an associative memory hit indication is received. Next, in process block 564, a first partial address (e.g., base or offset address) is generated from a memory or other computer-readable medium based on the associative memory result. Next, in process block 566, a second partial address (e.g., base or offset address) is calculated or otherwise generated based on the context indication or other characteristic of the input interface or other source of the packet, and a memory address is calculated or otherwise generated based on the first and second partial addresses. Next, in process block 568, a lookup result is generated from a memory or other computer-readable medium based on the memory address; and in process block 570, this lookup result is used in processing the packet. Processing returns to process block 562

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for processing a packet, the apparatus comprising:

input interface circuitry configured to receive the packet;

a context indicator generator, coupled to the input interface circuitry, configured to generate a context vector based on a characteristic of the input interface circuitry and a first subset of the packet;

a lookup word field generator, coupled to the input interface circuitry, configured to generate one or more lookup word vectors based on a second subset of the packet;

an associative memory, coupled to the context indicator generator and the lookup word field generator, configured to perform a lookup operation based on a lookup word to generate a lookup result, the lookup word including said one or more lookup word vectors and the context vector;

a memory configured to perform a lookup operation based on the lookup result to generate a first partial address;

a second memory configured to perform a lookup operation based on the first partial address and the context vector to generate a processing result; and a packet processor configured to modify or forward the packet based on the processing result.

2. The apparatus of claim 1, wherein the characteristic of the input interface circuitry includes an assigned Internet Protocol address.

3. The apparatus of claim 1, wherein the characteristic of the input interface circuitry includes an assigned address.

4. The apparatus of claim 3, wherein the assigned address includes an assigned source address; and wherein the first subset of the packet includes a packet source address.

5. The apparatus of claim 4, wherein the context vector identifies whether or not the packet source address matches the assigned source address.

6. The apparatus of claim 5, wherein the assigned source address includes an Internet Protocol source address.

7. The apparatus of claim 3, wherein the assigned address is an assigned virtual network address;

wherein the first subset of the packet includes a packet source address; and wherein the context indicator generator generates the context vector based on the assigned virtual network address and the packet source address.

8. The apparatus of claim 7, wherein the context vector identifies whether or not the packet source address corresponds to the assigned virtual network address.

9. The apparatus of claim 8, wherein the virtual network address comprises a plurality of Internet Protocol (IP) subnets.

10. The apparatus of claim 3, wherein the input interface terminates a plurality of analog or digital telephonic calls; and wherein the assigned address varies between each of the plurality of analog or digital telephonic calls.

11. The apparatus of claim 1, wherein the context indicator generator includes one or more of a processing element group comprising: shift registers, macros, custom circuitry, processors, memory, computer-readable medium, and an application-specific integrated circuit (ASIC).

12. The apparatus of claim 1, wherein the context vector includes a virtual network identifier.

13. A method for processing packets, the method comprising:
receiving a context indication;
receiving a source address of a packet;
generating a context vector based on the context indication and the source address, the context vector indicating whether the source address matched the context indication;
extracting one or more lookup values from the packet;
generating a lookup word including the context vector and said one or more lookup values;
providing the lookup word to an associative memory;
initiating a lookup operation in the associative memory using the lookup word to generate a lookup result;
processing the packet based on the lookup result;
receiving a second context indication;
receiving a second source address of a second packet;
generating a second context vector based on the second context indication and the second source address;
processing the second packet based on the second context vector;
wherein the second context indication is different than the context indication, the second source address is different than the source address; and the context vector is the same as the second context vector.

14. The method of claim 13, wherein the context indication is an assigned address.

15. The method of claim 14, wherein the assigned address is an Internet Protocol (IP) host address.

16. The method of claim 14, wherein the assigned address is an Internet Protocol (IP) subnetwork address.

17. The method of claim 14, wherein the assigned address is a virtual network address.

18. The method of claim 17, wherein the virtual network address includes a plurality of Internet Protocol (IP) subnets.

19. The method of claim 13, wherein said processing of the packet based on the lookup result includes: performing a lookup operation in a memory based on the lookup result to generate a result with said processing of the packet being performed based on the result.

20. The method of claim 19, wherein processing of the second packet based on the second context vector includes: extracting one or more second lookup values from the second packet; generating a second lookup word including the second context vector and said one or more second lookup values; providing the second lookup word to the associative memory; and initiating a second lookup operation in the associative memory using the second lookup word to generate a second lookup result based on which the second packet is processed.

21. The method of claim 20, wherein said processing of the second packet based on the second lookup result includes: performing a second lookup operation in the memory based on the second lookup result to generate a second result with said processing of the packet being performed based on the second result.

22. A method for processing a packet, the method comprising:
receiving the packet on an input interface;
generating a context vector corresponding to a characteristic of the input interface;
generating one or more lookup word vectors based on the packet;
initiating a lookup operation in an associative memory based on a lookup word, the lookup word including said one or more lookup word vectors and the context vector;
performing a memory lookup operation based on the lookup result of said lookup operation in the associative memory to generate a first partial address;
deriving a second partial address based on the characteristic of the input interface;
performing a second memory lookup operation based on the first partial address and the second partial address to generate a processing result; and
modifying or forwarding the packet based on the processing result.

23. An apparatus comprising:
interface circuitry configured to receive a packet;
a context indicator generator configured to generate a context vector based on a characteristic of the interface circuitry and a first subset of the packet;
a lookup word field generator configured to generate one or more lookup word vectors based on a second subset of the packet;
an associative memory configured to perform a lookup operation based on a lookup word in order to generate a lookup result the lookup word including said one or more lookup word vectors and the context vector; and
a packet processor configured to process the packet based on the lookup result;
wherein the characteristic of the interface circuitry includes an assigned address;
wherein the interface circuitry terminates a plurality of analog or digital telephonic calls: and wherein the assigned address varies between each of the plurality of analog or digital telephonic calls.

24. The apparatus of claim 23, wherein said processing of the packet based on the lookup result includes: performing a lookup operation on a memory based on the lookup result to generate a result with said processing of the packet being performed based on the result.

25. An apparatus comprising:
means for receiving packets corresponding to a plurality of calls;
means for identifying how to process each particular packet of said packets; and
means for processing said each particular packet based on its corresponding said identification of how to process the packet;
wherein said means for identifying how to process each particular packet includes: means for generating a context vector corresponding to a characteristic of said means for receiving packets, wherein the characteristic is identified based on a call of the plurality of calls corresponding to the particular packet and varies among the plurality of different calls; means for generating one or more lookup word vectors based on the particular packet; and
means for initiating lookup operations in an associative memory based on a lookup word, the lookup word including said one or more lookup word vectors and the context vector corresponding to the particular packet.

26. The apparatus of claim 25, wherein said means for identifying how to process each particular packet includes: a memory configured to generate a result based on a lookup result of the associative memory.

* * * * *

UNITED STATES PATENT AND TRADEMARK OFFICE
CERTIFICATE OF CORRECTION

| | |
|---|---|
| PATENT NO. | : 7,336,660 B2 |
| APPLICATION NO. | : 10/159055 |
| DATED | : February 26, 2008 |
| INVENTOR(S) | : Pullela |

Page 1 of 1

It is certified that error appears in the above-identified patent and that said Letters Patent is hereby corrected as shown below:

Col. 4, line 43, replace "thereof The" with -- thereof. The --

Col. 9, line 23, replace "block 5 10," with -- block 510, --

Col. 11, line 1, replace "circuitry." with -- circuitry, --

Signed and Sealed this

Twenty-seventh Day of October, 2009

David J. Kappos
*Director of the United States Patent and Trademark Office*